(12) United States Patent
James

(10) Patent No.: US 6,671,494 B1
(45) Date of Patent: Dec. 30, 2003

(54) SMALL, BATTERY OPERATED RF TRANSMITTER FOR PORTABLE AUDIO DEVICES FOR USE WITH HEADPHONES WITH RF RECEIVER

(75) Inventor: John James, Los Gatos, CA (US)

(73) Assignee: Competive Technologies, Inc., Fairfield, CT (US)

( * ) Notice: Subject to any disclaimer, the term of this patent is extended or adjusted under 35 U.S.C. 154(b) by 0 days.

(21) Appl. No.: 09/099,099

(22) Filed: Jun. 18, 1998

(51) Int. Cl.[7] .................................................. H04B 1/34
(52) U.S. Cl. ............................. 455/66; 455/41; 455/95; 455/129; 455/557; 381/15
(58) Field of Search ......................... 455/568, 41, 66, 455/95, 90, 351, 349, 575, 129, 557; 381/7.2, 15, 311, 328, 370, 376, 74

(56) References Cited

U.S. PATENT DOCUMENTS

| | | | |
|---|---|---|---|
| 3,087,117 A | * | 4/1963 | Mitchell |
| 3,906,160 A | * | 9/1975 | Nakamura et al. ............. 381/9 |
| 4,232,189 A | * | 11/1980 | Leitch .......................... 381/15 |
| 4,369,521 A | * | 1/1983 | Sawada ................... 455/351 X |
| 4,845,751 A | * | 7/1989 | Schwab ....................... 381/311 |
| 5,167,535 A | * | 12/1992 | Kovacik et al. ............ 439/620 |
| 5,289,543 A | * | 2/1994 | Leibman ........................ 381/7 |
| 5,303,398 A | * | 4/1994 | Tults ....................... 455/182.1 |
| 5,333,176 A | * | 7/1994 | Burke et al. ................. 455/557 |
| 5,423,056 A | * | 6/1995 | Linquist et al. ............. 455/458 |
| 5,590,407 A | * | 12/1996 | Ishikawa et al. .............. 455/66 |
| 5,628,055 A | * | 5/1997 | Stein ........................... 455/575 |
| 5,721,783 A | * | 2/1998 | Anderson .................... 381/328 |
| 5,771,441 A | * | 6/1998 | Altstatt ......................... 455/66 |
| 6,064,860 A | * | 5/2000 | Ogden .......................... 455/66 |
| 6,208,867 B1 | * | 3/2001 | Kobayashi ................... 455/568 |
| 6,212,282 B1 | * | 4/2001 | Mershon ...................... 381/77 |
| 6,353,406 B1 | * | 3/2002 | Lanzl et al. ................. 342/118 |
| 6,452,626 B1 | * | 9/2002 | Adair et al. ................. 455/556 |

* cited by examiner

*Primary Examiner*—Tracy Legree
(74) *Attorney, Agent, or Firm*—Paul A. Levitsky

(57) ABSTRACT

A portable FM stereo RF transmitter having an audio plug extending therefrom directly or via a cable and which mates with the earphone or output jack of an audio source such as a portable battery operated CD or tape player and having no external antenna. The portable RF transmitter modulates audio signals from the audio source onto an FM carrier and transmits them to an FM receiver mounted on a headset worn by a user. The RF transmitter uses its own ground circuit and the ground circuit of the audio source as two elements of a short dipole. The two ground circuits are electrically isolated at RF by an RF choke but connected together at audio frequencies by the low impedance of the choke at audio. The choke's leakage inductance also reduces the capacitive reactance of the dipole antenna for better power dissipation. A transformer coupling the RF output to the dipole transforms the impedance of the dipole to a value closer to the output impedance of the RF transmitter. A phase lock loop controls the carrier frequency to remain in the center of the channel even as the battery voltage drops.

28 Claims, 11 Drawing Sheets

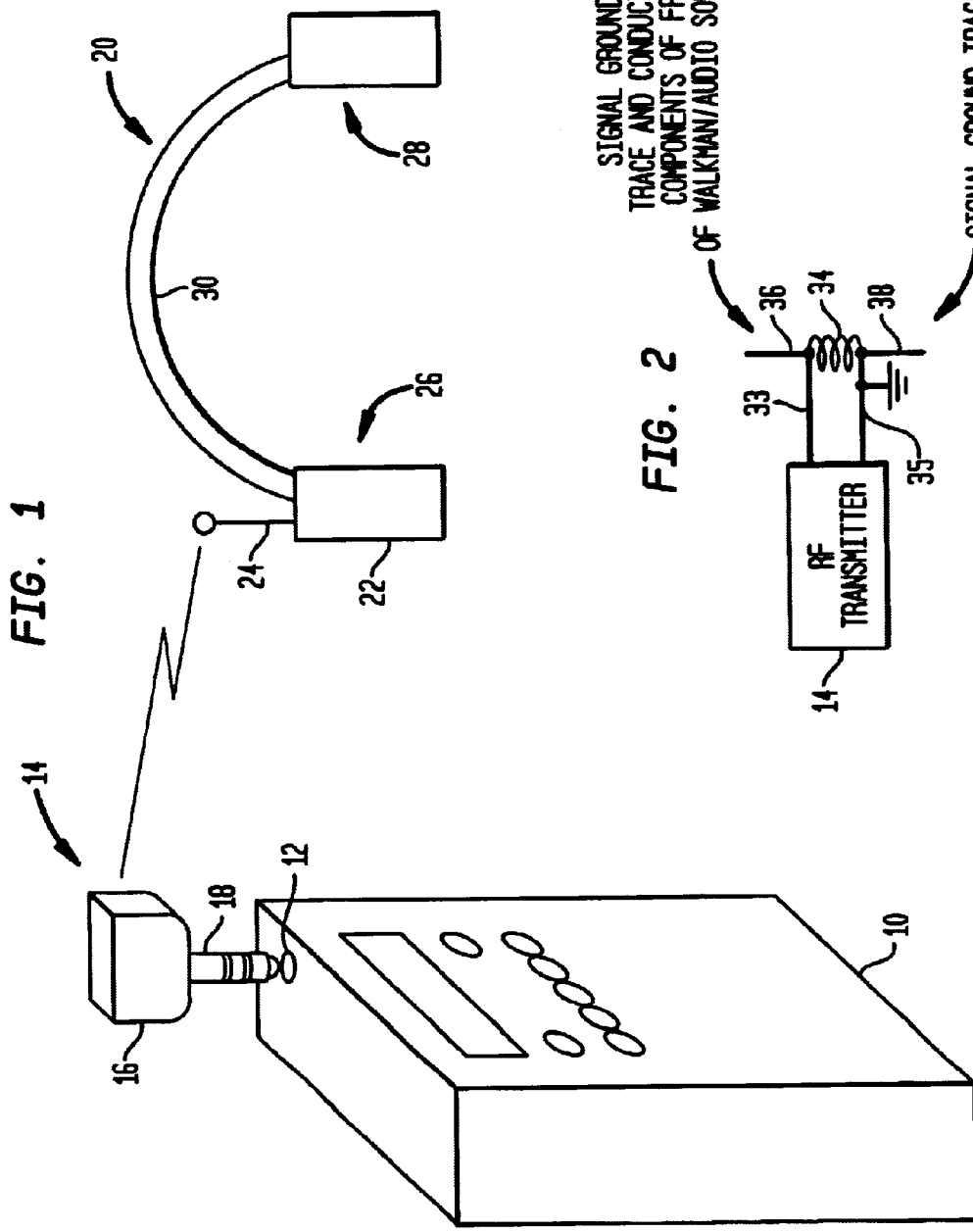

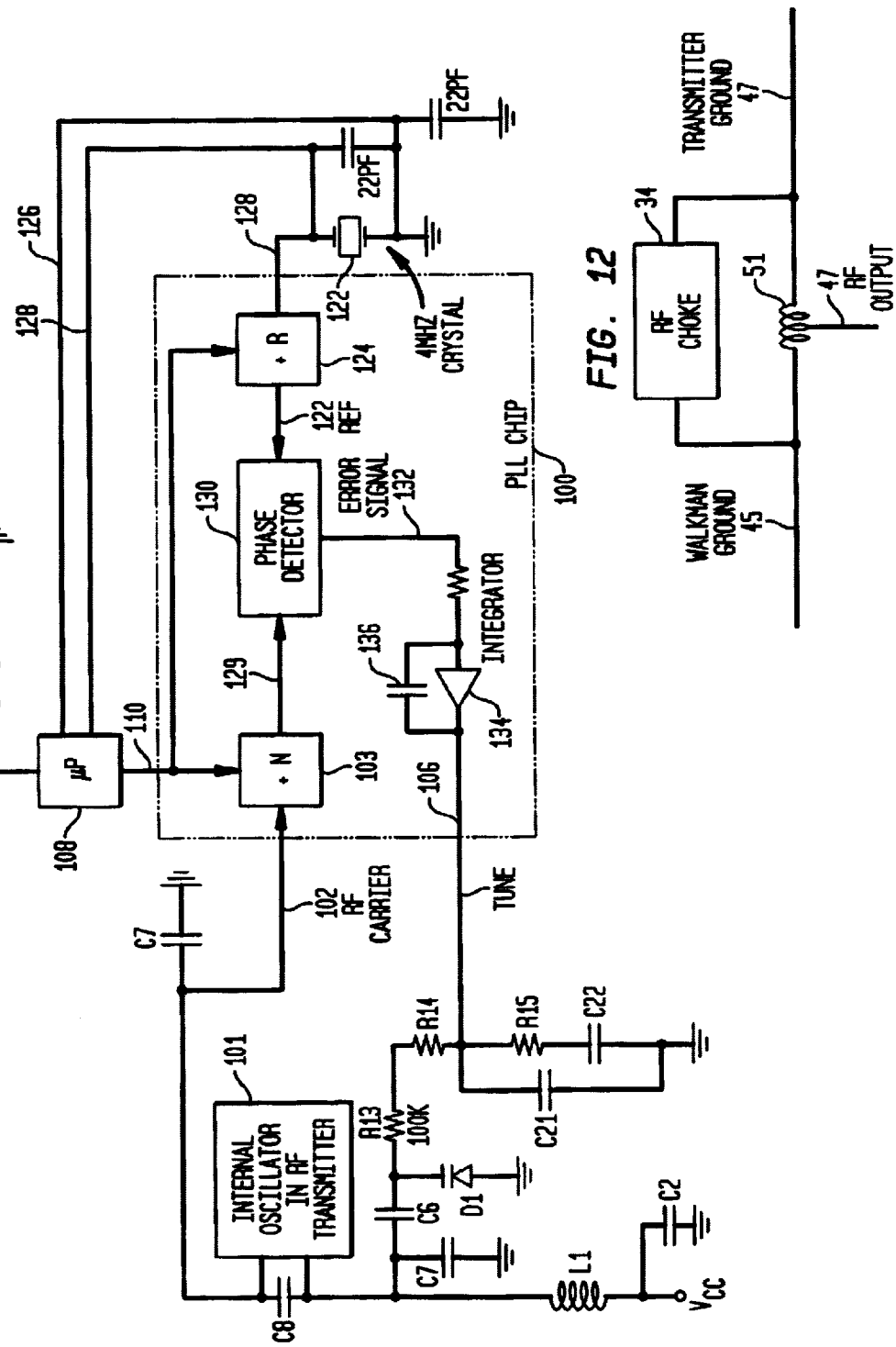

SMALL, BATTERY OPERATED RF TRANSMITTER FOR PORTABLE AUDIO DEVICES FOR USE WITH HEADPHONES WITH RF RECEIVER

BACKGROUND OF THE INVENTION

The invention pertains to the field of portable audio equipment.

1. Technical Field

With the widespread use of portable AM/FM receivers, portable AM/FM/Cassette players or cassette players standing alone and the rising popularity of portable CD players, a need has arisen for a good way of getting the audio signals to the user's ears. Currently, users wear headphones which are coupled to the portable audio device by wires. These wires are inconvenient and possibly dangerous. Typically, users wear such portable audio devices while they are doing other things such as working out, rollerblading, doing manual labor, driving, cleaning the house etc. During such activities there is frequently a great deal of arm motion and sometimes there are moving or stationary objects which are or pass within close range of the users upper torso. The wires connecting headphones to the portable audio device usually swing freely in the space around the users upper torso since the typical place users place the portable audio device is along their waistline on a belt or in a special carrying case. As a result of the wires swinging freely in the space around the users upper torso between the users waist and the headphones, the wires frequently get tangled up with the users arms, or snag on some stationary or, worse, some moving object near the users upper torso. This can be not only destructive to the portable audio equipment and headphones but dangerous as well. Further, having the headphone yanked from your head and possibly sending eyeglasses flying with them can be embarrassing.

Therefore, a need has arisen for a device which can attach to a portable audio device and which can transmit audio signals from the portable audio device to the headphones without wires but which is small enough to be unobtrusive.

2. Background Art

Wireless FM transmitters from audio equipment to headphones with FM receivers therein are known. For example, Recotan makes a line of AC powered FM transmitters that receive audio signals from a stereo receiver, cassette player, CD player or DAT tape drive unit. These audio signals are modulated onto an RF carrier which is transmitted. The user wears headphones with receivers therein and can be anywhere within about 500 feet. The problem with this unit is that it must be plugged into a source of AC power and it is too large to use with a portable audio device. The Recotan units have external antennas which have disk-like shapes not unlike the radomes on E-3 AWACS airborne radar planes. Since there is no source of AC power on a portable audio device and since there is no room for such a large antenna structure, the Recotan units represent an unacceptable solution for a portable audio device.

Small RF transmitters have been used on electric guitars to transmit audio signals from the guitar transducer to a receiver coupled to a power amplifier. An example of this type of technology is found in U.S. Pat. No. 5,025,704 to Davis. In Davis, a small transmitter built into a plastic housing which has a phone plug projecting therefrom is plugged into a female phone jack on a guitar. The female phone plug is coupled to a transducer in the guitar which senses the vibrations of the strings and converts them to audio signals. The audio signals are modulated onto an RF carrier and the carrier is coupled to a coil of wire 50 which acts as an antenna. The coil of wire is wrapped around the circuit board inside the housing. The Davis patent also teaches that the metallic strings of the guitar are also coupled to signal ground of the transmitter and that the coil of wire 50 induces RF radiation between the coil of wire 50 and the strings of the guitar.

Other examples of RF transmitters for stringed instruments include U.S. Pat. No. 3,080,785 [Battery powered RF transmitter that modifies transducer acoustic signal from string vibrations to enhance aesthetic effect]; U.S. Pat. No. 3,085,460 [Battery powered tunnel diode RF transmitter coupled to transducer system of electric guitar—external rod antenna projecting from top of guitar near performer's fret arm]; U.S. Pat. No. 3,743,751 [Drum sound effect unit small enough to fit inside electric guitar with signal from drum sound effect unit and transducer pickup for string vibrations summed and modulated onto RF carrier and transmitted via external antenna 90]; U.S. Pat. Nos. 3,825,666 and 3,901,118 [RF transmitter coupled to electric guitar]; U.S. Pat. No. 4,004,228 [portable transmitter with antenna conductor printed on printed circuit board with central area of printed circuit board with operative components carrying as much excess metal as possible so as to capacitively load the antenna and reduce the effect of any external conductors adjacent to the antenna and capacitively loading it and changing its impedance].

U.S. Pat. No. 4,344,184 teaches a wireless microphone not requiring external antenna. The microphone has a tubular housing is made of nonconductive material. A microphone projects from one end of the housing. The housing also contains an audio amplifier and a RF transmitter. The amplifier and transmitter are physically separated from each other, but are interconnected by RF chokes. The output of the transmitter is coupled to circuit ground of the audio amplifier such that the microphone and first circuit serve as one radiator of a dipole and the battery and second circuit serve as the other radiator of the dipole. U.S. Pat. No. 4,471,493 teaches a portable extension phone having an RF transmitter and an RF receiver therein, neither of which uses a whip antenna. The extension phone instead has a separate conductive plate which is part of a pivoting part of the phone which helps reflect sound from a user's lips toward a built in microphone. The conductive plate also serves as one element of a dipole. The other element of the dipole is a conductive static shield which also serves to protect elements on a printed circuit board inside the extension phone.

U.S. Pat. No. 4,430,757 teaches a portable RF ELT transmitter which is contained within a housing which is hung around the user's neck by a chain which forms a quarter wavelength antenna.

Other portable RF transmitters of interest include the transmitter taught in U.S. Pat. No. 2,840,694 to Morgan. This transmitter is basically a microphone that uses the microphone as the antenna. U.S. Pat. No. 4,794 622 teaches a low power, hand held RF transmitter which uses a surface acoustic wave resonator to stabilize the frequency of the RF oscillator to within 0.05% of the center frequency of the SAW resonator for the condition where the user's hand is enclosing the transmitter. The stability of the RF transmitter frequency allows the receiver to use an extremely narrow bandwidth thereby cutting down on the amount of extraneous signals received by the receiver. U.S. Pat. No. 4,612,668 teaches a battery operated transmitter coupled to an audio input device by a cable. This transmitter uses a printed circuit loop conductor on the printed circuit of the transmitter both as a tank circuit inductance and capacitance which determines the frequency of operation as well as the antenna. Another conductive plate formed on the undersurface of the protective case that houses the transmitter so as to be in close proximity to the loop conductor inductor serves as the opposing plate of the tank circuit capacitor, the first plate of which is the loop conductor inductor. By setting the dimensions of this plate, the capacitance can be altered thereby changing the transmitter frequency.

A wireless headphone system is taught in U.S. Pat. No. 4,845,751. In this system, a headphone unit has both a transmitter and a receiver therein. A radio or other stereo unit has a transmitter/receiver plugged into an audio output jack. The audio output of the stereo unit is transmitted as two separate stereo channels to the headphone unit where the headphone receiver receives the signal and feeds each channel to one of the earpieces of the headset. The transmitter in the headphones encodes signals from seek and scan buttons on the headset and transmits these signals to the receiver of the transmitter/receiver unit plugged into the audio output jack. There, the signals are decoded and coupled to electronically controlled seek and scan controls for the stereo receiver. No indication is given in this patent as to whether the transmitter plugged into the stereo receiver is battery operated. The transmitters of the unit plugged into the audio output jack of the stereo receiver feed a wire antenna 38.

U.S. Pat. No. 2,828,413 teaches a portable radio receiver which is encapsulated in a conductive container which is divided into two halves which are separated by a dielectric. The two conductive halves of the container form a dipole antenna the halves of which are coupled to the two terminals of the primary winding of a transformer which has its secondary winding coupled to the RF input of the receiver.

SUMMARY OF THE INVENTION

According to principles of the present invention, there is provided a genus of portable, battery operated transmitters which are mounted in a case and which have no external antenna. The audio input to these transmitters is from some audio source such as a portable CD or cassette player or computer and is coupled to the transmitter through an earphone jack or audio output jack on the back of the computer. The antenna is a dipole antenna comprised of the ground conductive trace of the transmitter and the ground conductive trace of the audio source, the two ground conductors being connected at audio frequencies by a tri-filar RF choke, but isolated from each other at RF frequencies by the RF choke.

In some species, the transmitter is mounted in a casing which is integrally formed with an audio input plug jack which mates with an earphone or output jack on an audio source. As with all other species in the genus, the transmitter uses its own ground trace and that of the audio source as a short dipole antenna thereby eliminating the need for an external antenna.

In all species in the genus, the transmitter modulates the audio signal from the audio source onto an RF carrier and transmits it to a headphone receiver worn by a user who is also usually wearing or carrying the audio source.

One key aspect of all species in the genus of the present invention is the use of some means such as an RF choke to simultaneously electrically isolate the two ground traces at RF frequencies but to couple them by a low impedance path at audio frequencies, and to utilize the leakage inductance of the RF choke to neutralize or partially offset the capacitive reactance of the short dipole antenna. This transforms the impedance of the antenna structure into a principally real axis impedance for better power transfer. Another key aspect of at least some species in the genus of the present invention is the use of a transformer or tank circuit coupled to the RF output of the transmitter and the short dipole antenna to step down the impedance of the short dipole to an impedance that more closely matches the output impedance of the RF amplifier so as to increase power transfer to the antenna.

There are several alternative embodiments, some of which are described below. One embodiment uses an analog tuned RF transmitter with an internal oscillator in the transmitter chip tuned by an external tank circuit, and a headphone receiver which has two cascaded piezoelectric resonators in the IF section to increase the selectivity of the receiver and aid in rejecting interfering signals from adjacent frequencies to the transmitter frequency. Another preferred embodiment uses a PLL and microprocessor to digitally synthesize the carrier frequency at a frequency which is precisely located in the center of the channel the receiver is listening to eliminate distortion of the received signal that can be a problem in the analog embodiments if their frequency drifts off the center of the channel.

BRIEF DESCRIPTION OF THE DRAWINGS

FIG. 1 is a perspective view of a system utilizing the teachings of the invention.

FIG. 2 is a schematic diagram illustrating the use of an RF choke to electrically isolate the audio source ground circuit from the transmitter ground circuit at RF so as to implement a short dipole antenna using these ground circuits.

FIG. 11 shows the equivalent structure of the PLL using the internal oscillator of the RF transmitter as the voltage controlled oscillator.

FIG. 12 is an equivalent circuit illustrating the impedance matching and isolation at RF frequency circuitry that attempts to match the impedance of the antenna to the output impedance of the amplifier and which converts the two ground circuits to isolated elements of a dipole at RF but the same conductor at audio frequencies.

DETAILED DESCRIPTION OF THE PREFERRED EMBODIMENT

Figure 3:
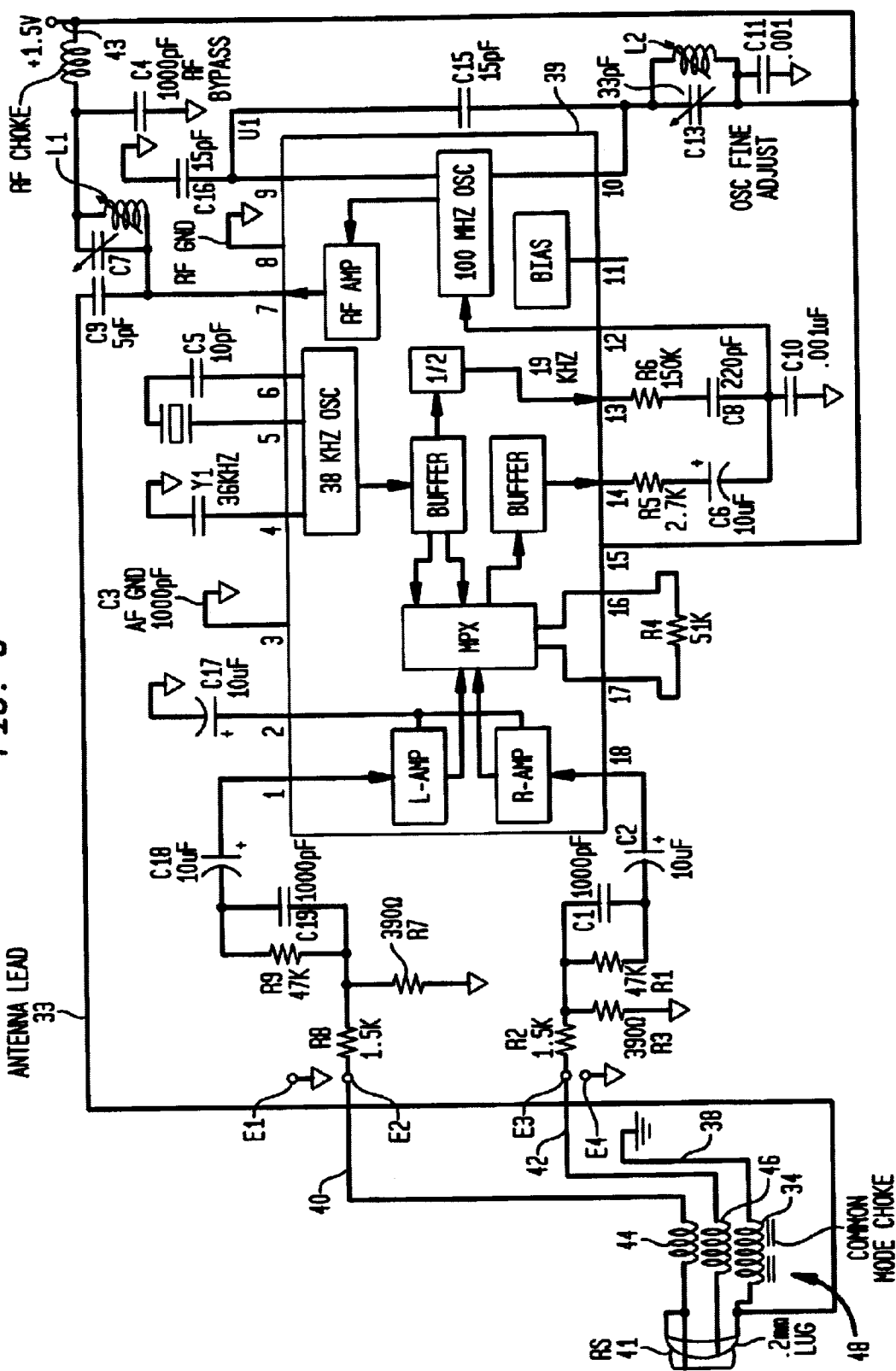
FIG. 3 is a detailed schematic diagram of the transmitter circuit of one embodiment.

Referring to FIG. 1, there is shown a diagram of a system within the genus of the invention. A battery operated audio source 10, typically a portable stereo radio, a portable cassette player or a portable compact disk player, generates audio signals from received radio signals or program material recorded on a medium. These audio signals are presented at a headphone or output jack 12.

A portable, battery operated RF transmitter 14, comprised of a transmitter housing 16 and enclosed integrated circuitry and a male plug 18, which plugs into the headphone or output jack 12. The audio signals generated by the audio source 10 are amplified and modulate an RF carrier. The RF carrier is coupled into an antenna for radiation to a headphone receiver 20. The antenna for the RF transmitter 14 is comprised of the ground circuit of the RF transmitter as one half of a dipole and the ground circuit and other conductive components of the housing of the portable audio source 10 as the other half of a dipole. A dipole antenna as used herein includes any antenna having two radiating elements.

The headphone set 20 has a built in radio receiver 22 with a small dipole or rod antenna 24. The radio receiver 22 has an audio output which is coupled to two earphone pieces 26 and 28 which are held adjacent a wearer's ears by frame 30. The advantage of the above described system is that there are no wires that couple the audio source to the headphones. This prevents the user from possibly snagging the wires on his or her arms during exercise or physical work and prevents the user from catching the wires on weightlifting equipment in use by the user or items the user is walking by. Catching the wires can not only damage the audio source and headphones by causing them to be dragged from the user's body and dropped from a distance onto a hard floor, but also presents a potential safety hazard. Note that there is no external antenna whip or rod on RF transmitter 14. This is a handy feature since the audio source is often worn on the user's beltline, so a whip antenna sticking up further than the transmitter 14 itself could poke the user in the side and would be susceptible to bending or breakage by active users who are moving around.

FIG. 2 illustrates a schematic diagram of the antenna arrangement used in the preferred embodiment. The circuitry of the RF transmitter audio amplifiers, RF oscillators and modulators is represented by block 14. The modulated RF carrier is output on lines 33 and 35 from the RF transmitter. Lines 33 and 35 are coupled to an RF choke 34, which, at audio signal frequencies is a short, but at the RF frequency of the carrier output by the RF transmitter appears as a high impedance. Line 33 is coupled to a conductive dipole element 36 which is comprised of the signal ground trace and any conductive components of the audio source 10 which are coupled to signal ground. Line 35 is coupled to a conductive element 38 which is the other half of a dipole and which comprises the signal ground trace and conductive components of the RF transmitter 14. The RF choke 34 allows the signal ground of the audio source 10 to be coupled by a low impedance path to the signal ground of the RF transmitter 14 at audio frequencies. However, since the RF choke 34 acts as a high impedance at the carrier frequency, the dipole elements 36 and 38 are virtually electrically isolated from each other at the carrier frequency. This means that the alternating voltages on lines 33 and 35 which are oscillating at the carrier frequency drive the dipole elements with alternating voltages at the RF frequency and are not shorted by the RF choke 34. The RF choke 34 provides the advantage of allowing the signal ground traces of the audio source and the RF transmitter to be coupled by a low impedance path so that the circuitry in each unit has a common reference voltage and to eliminate any possible ground loops.

Referring to FIG. 3, there is shown a detailed schematic diagram of one embodiment of the RF transmitter 14 which shows details of one embodiment for an antenna impedance matching arrangement. The RF transmitter 14 includes a commercially available stereo FM transmitter integrated circuit 39 manufactured by Rohm under Model Designation BA1404. The transmitter contains a stereo modulator which modulates the RF output signal using as input the audio signals on lines 40 and 42 received from the audio source 10. These audio signals enter the transmitter through two coils 44 and 46 of a three coil common mode RF choke 48. These coils 44 and 46 couple audio signal input lines 40 and 42 to the tip and ring lines of a 3.3 millimeter stereo audio plug 41 which plugs into the earphone or output jack 12 on the audio source 10. The audio signals have an amplitude controlled by the volume control on the audio source. This amplitude controls the amount of frequency deviation of the transmitter, so some precautions must be taken to limit the amount of deviation. Resistors R8 and R7 along with a preemphasis circuit comprised of resistor R9 and capacitor C19 control the ratio of audio output voltage to resulting FM frequency deviation such that the deviation does not exceed the standard 75 kHz deviation used by FM broadcast receivers and so as to not deviate the carrier frequency outside the passband of the receiver 22 thereby degrading reception. Resistor R2 and R3 combined with preemphasis circuit R1 and C1 provide the same protection for the other stereo channel. The preemphasis circuits matches the deemphasis circuit in the receiver which is present to improve signal to noise ratio. The preemphasis circuits are coupled to the transmitter by DC blocking capacitors C17 and C2.

The audio inputs are coupled through these blocking capacitors to left and right amplifiers and are then coupled to an stereo multiplexer. The purpose of this FM multiplexer is to provide FM stereo multiplexing for stereo decoding in the receiver. The FM stereo multiplexer encodes the incoming audio left and right channels by summing the left and right channels to generate a first signal. The summing is performed at the junction of capacitors C6, C8 and C10. The left and right channels are differenced to generate a second signal. The second signal modulates the 38 kHz signal to generate a third signal. The 38 kHz signal is also divided by two to generate a 4th signal, which is used as a pilot signal. The fourth signal, first signal and third signal are then summed to generate a encoded output signal, which is then used to FM modulate a carrier frequency. This encoded output signal is comprised of three portions. The region which is from 50 Hertz to 15 kHz, is comprised of the left plus right channels. The second portion is the pilot signal at 19 kHz, and the third is the region from 23 to 53 kHz which comprises the left minus right channels.

The RF choke 48 has a third coil 34 which shares the same magnetically permeable core as coils 44 and 46. Coil 34 couples the shield terminal of audio plug 41 to signal ground 38 of the RF transmitter. Signal ground 38 of the RF transmitter acts as one conductor of the antenna dipole. The other conductor 38 of the antenna dipole is the ground trace of the audio source which is coupled to the shield terminal of the audio plug 41 by a shield terminal on the earphone or output jack of the audio source. The shield terminal of the audio plug 41 is also coupled by line 33 to the RF output of the RF amplifier of the transmitter which is driven by pin 7. Pin 7 is separated from line 50 by a DC blocking capacitor C9. Line 33 is also coupled to an impedance matching circuit comprised of the tank circuit comprised of capacitor fixed capacitor C7 and fixed inductor L1. The function of this tank circuit is to attempt to match the output impedance of the RF transmitter with the input impedance of the antenna structure comprised of the two ground traces of the RF transmitter and the audio source. Because the impedance of the antenna structure depends upon the size and the physical configuration of the conductive ground traces and chassis structures of the audio source and RF transmitter, the impedance of the antenna structure will vary from one audio source to another. Therefore, the values of C7 and L1 are, in one embodiment, selected to make the best impedance match for most impedances which will be encountered in practice. Since the needed range for the transmitter to the headphone receiver is typically only 3 feet or so, an exact impedance match is not required as in long range receivers but it is important to achieve as much power transfer as possible from the transmitter to the antenna for best reception. In alternative embodiments, either or both of capacitor C9 and inductor L1 are tunable such that the user can alter the inductance or capacitance or both while listening to the signal to set these values at settings which give the best reception. These embodiments are represented by the dashed arrows through C7 and L1. The tank circuit couples pin 7 to the positive voltage supply Vcc at 43. A bypass capacitor C4 bypasses any RF energy to signal ground to keep it out of the battery. Terminal 43 is coupled to a 1.5 volt battery.

The coil 34 of the RF choke provides a low impedance path at audio frequencies between the signal ground of the RF transmitter and the signal ground of the audio source. However, at the 88–108 MHz output frequency of the RF carrier from the transmitter (or whatever other frequency is used for the RF carrier such as 40 mHz), coil 34 should be selected to have a high impedance thereby electrically isolating the two ground traces such that they can operate as the two electrically isolated elements of a short dipole antenna so as to radiate the RF energy generated by the transmitter to the headphone receiver. Of course, when the transmitter is transmitting on other than the FM broadcast band, a compatible headphone receiver must be used that can tune to the transmitted frequency. If a carrier in the 40 mHz range is used, a 40 mHz FM stereo headphone receiver is commercially available from Brookstone of Nashua, Mass.

In the preferred embodiment, the center frequency of the RF carrier generated by the transmitter is set by the fixed values of capacitor C13 and inductor L2 forming a tank circuit which controls the frequency of the RF oscillator in the transmitter. In the preferred embodiment, the frequency is set before shipment by bending the inductor L2 to change its inductance. In alternative embodiments, either the capacitance of capacitor C13 or the inductance of inductor L2 may be varied, or both may be varied by the user in the field to set the frequency of transmission of the transmitter. This allows the user to move the frequency of his or her transmitter in case a strong local station is causing interference. These embodiments are represented by the dashed arrows through capacitor C13 and inductor L2. In an alternative embodiment, the tank circuit comprised of L2 and C13 can be replaced by a piezoelectric resonator (crystal oscillator).

Pin 8 of the transmitter is coupled to the ground trace 38 of the RF transmitter, so pin 8 represents conductor 35 in FIG. 2.

Figure 4:
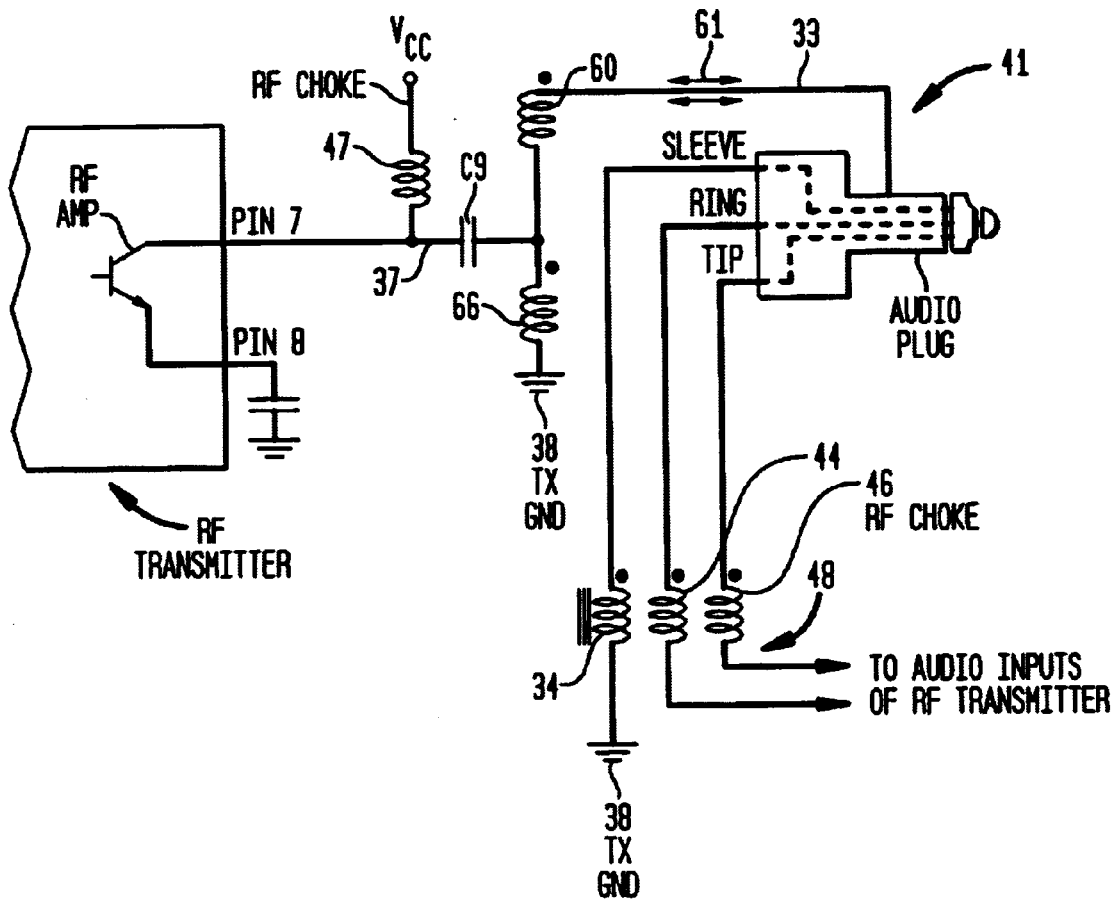
FIG. 4 is a schematic diagram showing another embodiment of an output circuit using an RF choke for neutralizing the capacitive reactance of the antenna and using an autotransformer to step the antenna impedance down closer to the output impedance of the RF amplifier of the transmitter.

FIG. 4 represents an alternative embodiment for an output impedance matching structure. In this structure, pin 7 of the transmitter is coupled through a DC blocking capacitor 58 to the center tap a broadband impedance matching transformer 60. The transformer 60 is a one to one transformer with the primary portion of the winding coupling pin 7 to the transmitter signal ground 38. The other half of this single winding in transformer 60 acts as the secondary winding. The RF carrier signals on line 37 pass through DC blocking capacitor C9 and coupled to the transmitter signal ground through the bottom half of the transformer 60 winding thereby setting up an oscillating magnetic field which is coupled to the top half of the winding. This induces an EMF voltage in the top half of the winding which is coupled by line 33 to the sleeve of the audio plug 41. This sleeve is coupled through the earphone or output jack sleeve terminal to the signal ground trace of the audio source to act as one half of the dipole antenna. The other half of the dipole antenna is the transmitter signal ground conductive trace on the RF transmitter printed circuit board represented by the ground connections at 38. RF choke coils 44 and 46 couple the tip and ring terminals of the audio jack to the audio input ports of the transmitter (not shown). Vcc voltage is coupled to pin 7 through an RF choke 47. The signal ground trace of the RF transmitter is electrically isolated at RF frequencies from the signal ground trace of the audio source by the third coil 34 of the RF choke. The three coils of the RF choke 48 are made by winding tri-filar wire around a single core. The RF choke functions not only to isolate the two ground traces at RF frequency but also the RF choke leakage inductance helps tune out some of the capacitive reactive impedance of the short antenna structure as seen from wire 33 looking into the antenna structure at point 61.

Figure 5:
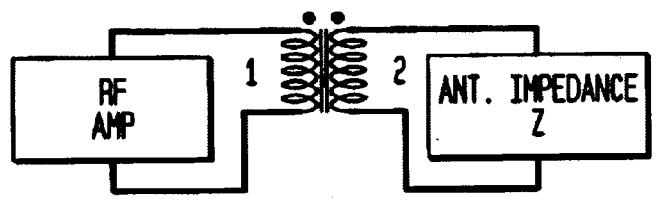
FIG. 5 is a schematic diagram illustrating how the autotransformer steps the antenna impedance down.

Because the transmitter is very low power, it is important to maximize the power transfer from the transmitter to the antenna structure. Maximum power transfer occurs when the impedance at point 61 looking into the antenna structure is the complex conjugate of the impedance looking back from point 61 into pin 7 (the output stage of the RF amplifier). To help do this, the RF choke 48 and the transformer 60 are used. The antenna impedance of the two ground traces is a complex impedance with a real component and a capacitive reactive component because of the shortness of the antenna. Short antennas are defined as antennas whose dimensions are much smaller than the wavelength. At 100 MHz, the wavelength is 3 meters, so the physical dimensions of the antenna structure described herein qualify it as a short antenna. In the treatise, Schelkunoff and Friis, Antennas: Theory and Practice, (Wiley & Sons New York) 1952, the entirety of which is hereby incorporated by reference, it is stated at Section 1.7, page 18 that short antennas are primarily capacitors. By addition of the RF choke, the leakage inductance coupled to the sleeve of the audio plug substantially cancels the capacitive reactance of the antenna structure thereby rendering its impedance on the real or purely resistive axis. Because the impedance of the output stage of the RF amplifier is substantially lower than the antenna impedance, it is preferable to use step down transformer 60 to make the antenna impedance look lower at the RF amplifier output at pin 7. Step down transformer 60 does this. Each of the upper and lower coils is 10 turns, but the number of turns from the antenna terminal, i.e., point 60 to signal ground is 20 turns. The RF amplifier output at pin 7 sees only 10 turns from the center tap to ground. Therefore, the equivalent circuit is as shown in FIG. 5. Because the impedance of the antenna reflected through the transformer decreases as the square of the turns ratio, at the output of the RF amplifier, the antenna impedance is smaller by a factor of 4 because of the 2 to 1 turns ratio. This improves the power transfer from the RF amplifier to the antenna. Power transferred to the antenna is $V^2/R$ where R is the load impedance of the RF amplifier, i.e., the impedance looking into the antenna at the output of the RF amplifier, and V is the RMS amplitude of the RF carrier swings. The maximum value of V is fixed by the battery voltage of 1.5 or possibly 3 volts. Therefore, the only thing that can be done to increase the power dissipated in the antenna is to lower its apparent load impedance at the output of the RF amplifier. The transformer 60 does this by lowering the antenna impedance by a factor of 4. The fact that the RF choke makes the antenna impedance look primarily resistive helps in power dissipation also by eliminating the reactive component.

Figure 6:
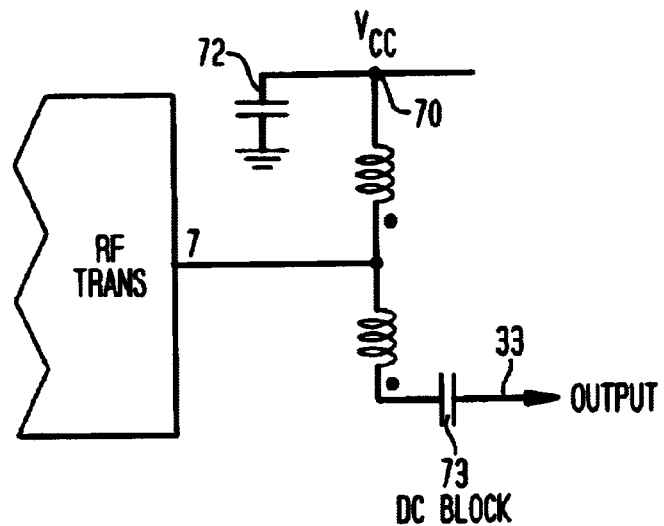
FIG. 6 is a schematic diagram of the preferred arrangement to step the antenna impedance down and supply Vcc voltage to the RF amplifier.
Figure 7:
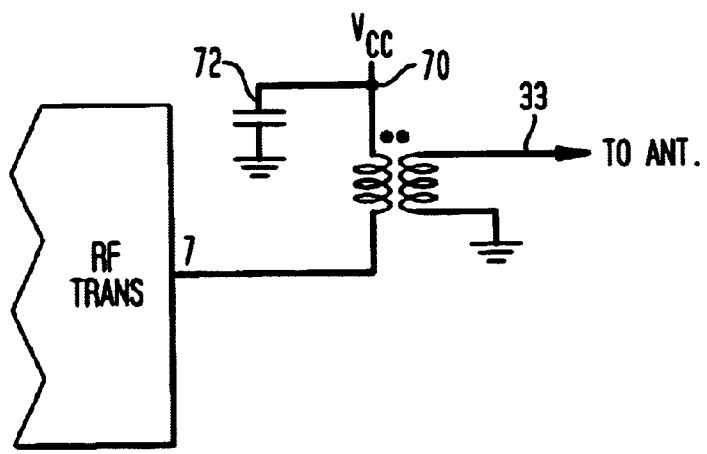
FIG. 7 is a schematic diagram of an alternative arrangement to step the antenna impedance down and supply Vcc voltage to the RF amplifier.

One alternative arrangement of supplying DC voltage to pin 7 is to connect the bottom of the primary winding 66 to the Vcc supply and putting a blocking capacitor at point 61. FIGS. 6 and 7 represent other embodiments for methods of coupling Vcc power to pin 7. FIG. 6 is the preferred embodiment. Vcc is coupled to point 70 which is coupled to ground at RF frequencies by capacitor 72 which makes point 70 RF signal ground 38 for the transmitter. A DC blocking capacitor 72 isolates the battery Vcc supply from the antenna lead 33 and from signal ground of the audio source. This eliminates the need for an RF choke such as choke 47 in FIG. 4 thereby making it easier to shrink the size of the RF transmitter package. FIG. 7 represents an alternative output arrangement which uses a transformer with electrically isolated primary and secondary windings. This provides DC isolation from the Vcc input at point 70 to the antenna output lead 33 thereby eliminating the need for blocking capacitor 72. Again, point 70 is RF signal ground 38 for the transmitter by virtue of point 70 being coupled to the ground trace by RF bypass/DC blocking capacitor 72.

Figure 8:
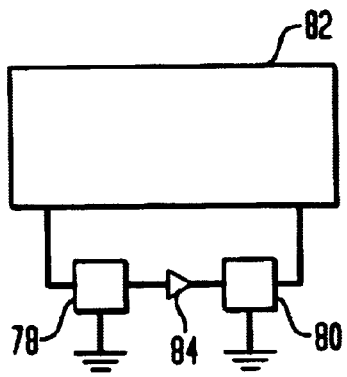
FIG. 8 is a diagram of the preferred receiver arrangement showing the use of two cascaded piezoelectric resonators in the IF section to increase receiver selectivity.

Referring to FIG. 8, there is shown a block diagram of an improvement in the headphone receiver that improves the selectivity thereof for better rejection of interfering signals from adjacent frequencies. The headphone receiver 22 is typically a General Electric GE 7-1295 type superhetrodyne FM receiver which is comprised of two receiver chips having model numbers TA7792F and 7766AF and is manufactured by Thomson Consumer Electronics, Inc. in Indianapolis. Typically such receiver chips utilize single, external IF filters in the form of piezoelectric resonators. These resonators have passbands centered around the IF frequency, but their skirt slopes are not sufficiently steep to provide adequate selectivity for best performance. To increase the steepness of these skirts in the transfer function passband of the overall receiver, two piezoelectric resonators are ganged to at least double the steepness of the skirts outside the 3 db points. Those two piezoelectric resonators are shown at 78 and 80. Because these piezoelectric resonators impose losses of 7–8 db, an amplifier 84 that provides 7–8 db of gain is used so that sufficient drive to the discriminator circuit within receiver chip 82 to allow adequate reception. The maximum deviation of the FM carrier from transmitter 14 is approximately 75 kHz. The Carson rule on bandwidth requires that the overall transfer function of the FM receiver be two times the deviation plus the highest audio frequency that will be encountered in the transmitter input. This rule requires that the overall transfer function of the receiver 22 be approximately net 180–200 kHz. Because ganging the piezoelectric resonators narrows the bandwidth between the 3 db points in the resulting composite transfer function, resonators should be chosen which have slighter wider bandwidths than the desired net bandwidth of the overall receiver. Thus, resonators 78 and 80 should be selected to have 3 db bandwidths of approximately 230 kHz. Such piezoelectric resonators are commercially available from Toko under model designations SK107M2A0-00.

Figure 9A:
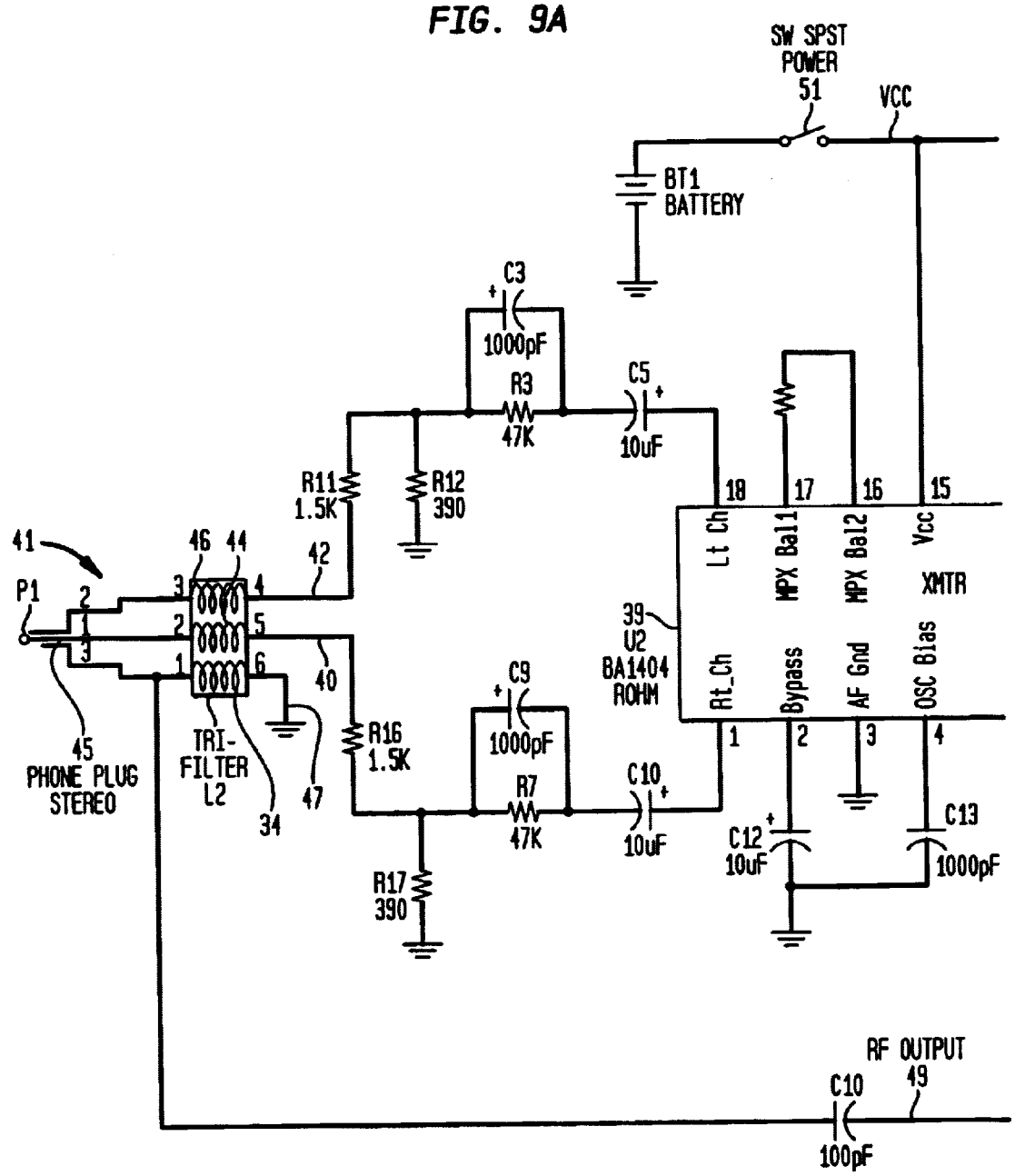
FIG. 9 is a schematic diagram of an improved analog portable transmitter which automatically compensates for battery voltage drop to attempt to keep the RF oscillator frequency in the center of the channel.
Figure 9B:
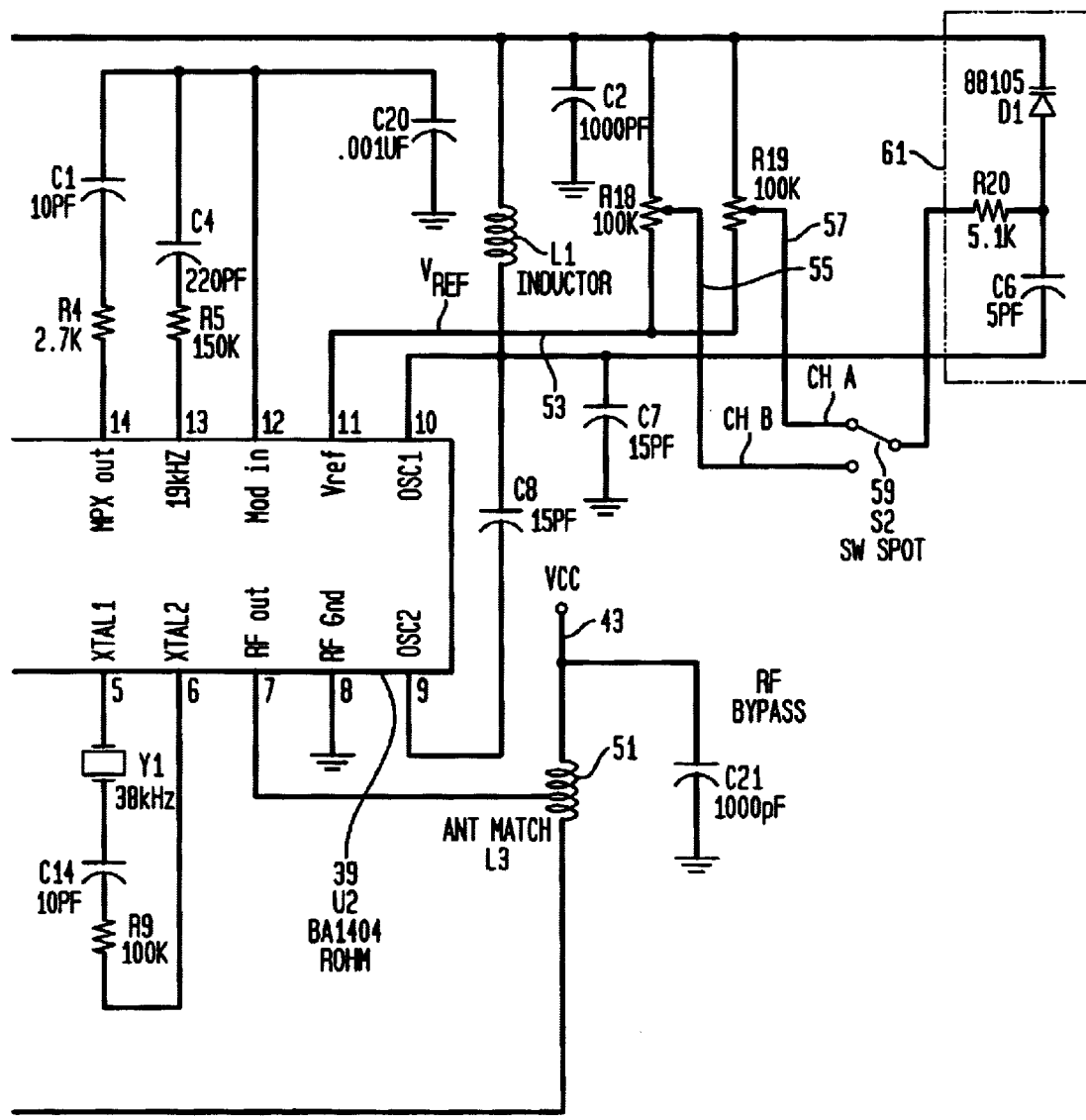

Referring to FIG. 9, there is shown an improved, more frequency stable analog embodiment. The principal differences over the analog embodiment of FIG. 3 are in the antenna impedance matching circuit and in use of a varicap variable capacitance diode in the tank circuit that tunes the frequency of the carrier generation oscillator in RF stereo transmitter chip 39. All reference numbers which are the same as reference numbers in FIG. 3 denote components that serve the same function. As is characteristic of all species in the genus of the invention, a common-mode, three tri-filar winding RF choke comprised of windings 34, 44 and 46 is used. All three winding have the same inductance which presents a high impedance at RF frequencies and a low impedance at audio frequencies. Winding 34 isolates the ground circuitry of the audio source, connected to conductor 45 of the phone plug 41, from the ground conductor 47 of the RF transmitter circuitry at RF frequencies but coupled them together at audio frequencies. Ground conductors 45 and 47 act as the two elements of a dipole antenna. The RF output of the transmitter on line 49 is coupled into the ground circuit 45 of the audio source through a center-tapped antenna impedance matching inductor 51. The center-tapped inductor 51 functions as an autotransformer that steps the input impedance of the antenna down to the output impedance of the transmitter 39 for better power transfer. The position of the tap establishes the turns ratio, and, in some embodiments, can be changed for different audio sources which cause different input impedances for the antenna structure.

Windings 44 and 46 of the tri-filar RF choke block any leakage RF that couples from the audio source ground conductor onto the audio output lines from being coupled into the audio inputs of the RF transmitter. The fact that the RF choke is made with tri-filar wire makes the impedances of all three windings identical so as to provide excellent common mode noise rejection to protect the stereo audio inputs of the RF transmitter from receiving any stray RF.

Another principal difference over the analog embodiment of FIG. 3 is in use of a first order temperature and battery voltage correction to stabilize the carrier frequency of the transmitter over time so as to do a better job of staying in the center of the channel. Pin 11 of the transmitter outputs a voltage reference that is temperature compensated and which is compensated to the first order for changing battery voltage. In the embodiment of FIG. 3, the RF transmitter frequency would change over time as the battery voltage dropped since the lower voltage caused different current levels to flow in various components which caused the oscillator frequency to drift over time. Other sources of drift in frequency were temperature changes that changed component impedance values and drift over time in these impedance values with aging. The reference voltage from pin 11 is coupled on line 53 to the bottom end of two potentiometers which had their top ends coupled to Vcc. The wipers 55 and 57 of these potentiometers are selectively coupled through a channel selection switch 59 to a variable capacitance diode network 61. Diode D1 is a varicap diode which changes its junction capacitance with changing voltage. The dropping value of Vref on line 53 over time with dropping voltage causes the capacitance of diode D1 to change over time with changing temperature and dropping battery voltage. The capacitance of diode D1 is coupled with the inductance of inductor L1 across the internal oscillator's external tank pins so as to cause the frequency of the oscillator to be adjusted to keep it on channel. Switch 59 selects which of two preset frequencies at which the oscillator generates a carrier. The exact frequency of each of these two channels is set by the positions of wipers 55 and 57. When these wiper positions are changed, the voltage across the reverse biased varicap diode D1 which changes its capacitance. This changes the resonant frequency of the parallel tuned tank circuit comprised of the capacitance of D1 and inductor L1. This embodiment will stay on channel during almost the entire life of the battery although it will wander around a little bit within the channel.

Figure 10A:
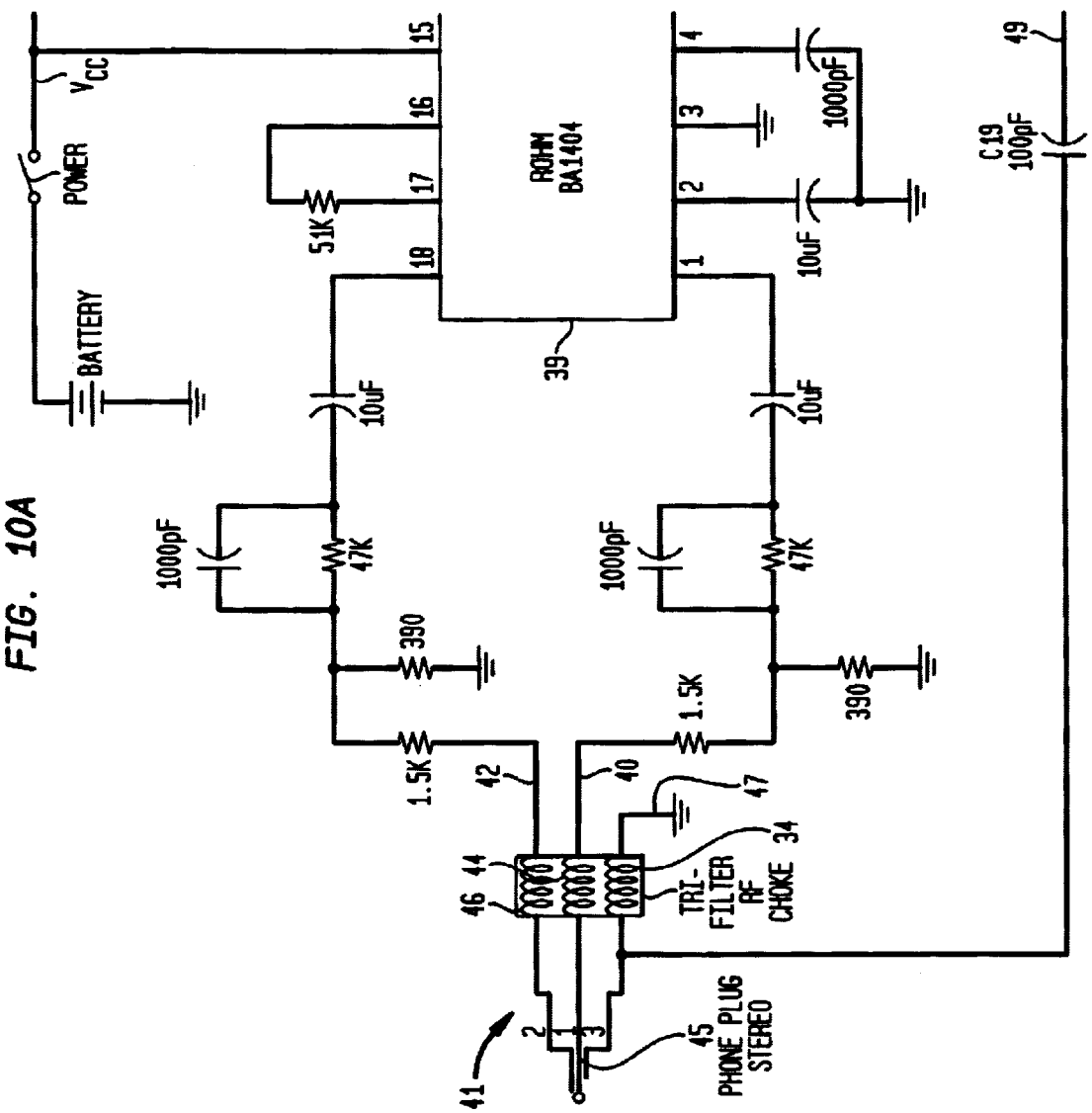
FIG. 10 is a schematic diagram of one digitally synthesized carrier embodiment.
Figure 10B:
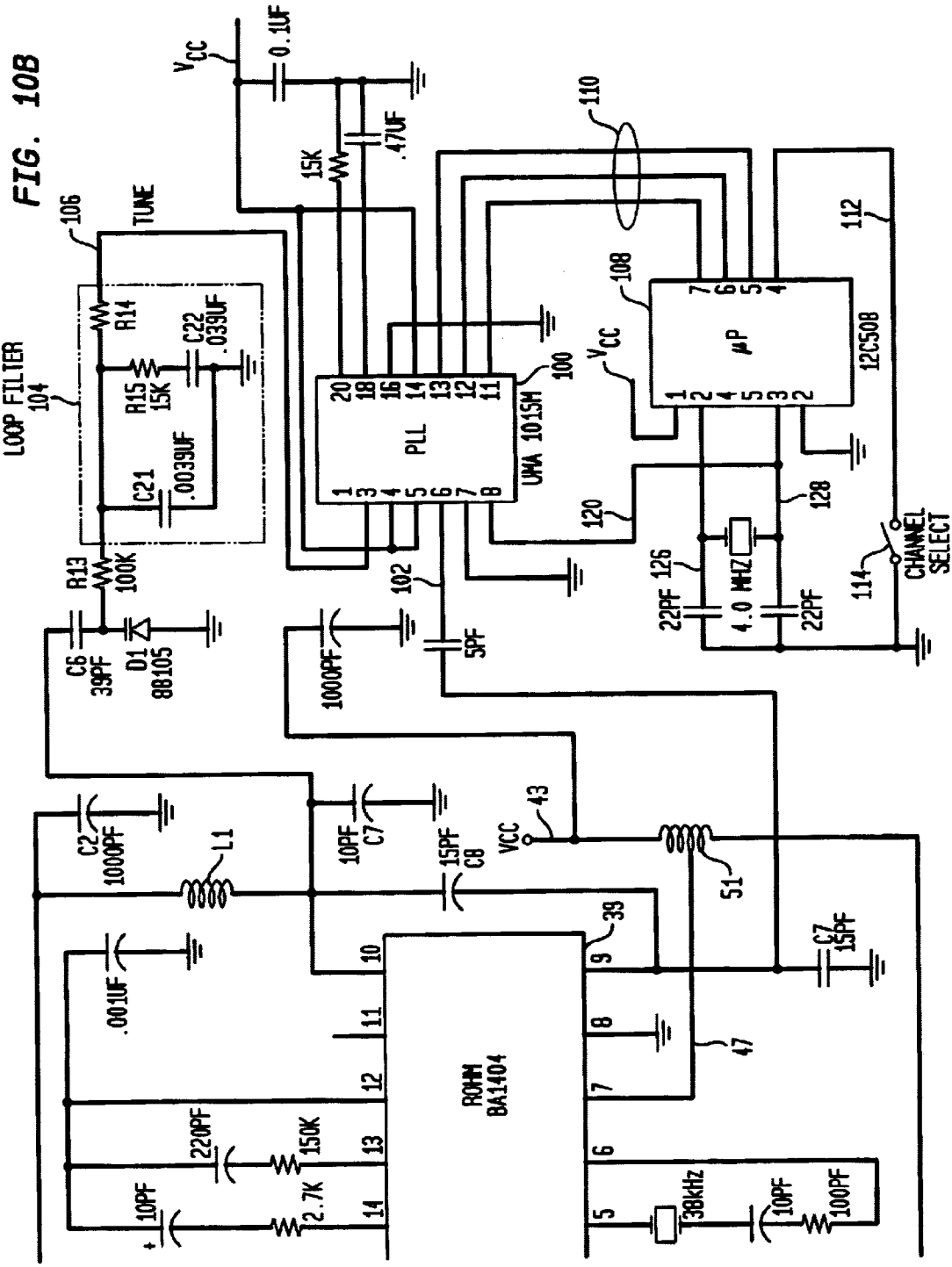

FIG. 10 is a schematic diagram of one digitally synthesized carrier embodiment which keeps the carrier frequency locked in the center of the channel. The advantage of this embodiment is that it reduces distortion by not allowing the center frequency of the Fourier spectrum of the RF caused by the FM modulation of the carrier to drift away from the center frequency of the IF passband of the filters in the receiver. The receiver in the system of the invention is a digitally tuned headset which stays locked on the desired channel. As a result, the center frequency of the IF channel stays locked and the filters establish a bandwidth for the passband centered on that frequency of approximately 200 kHz. An FM modulated carrier has a Fourier spectrum which is centered around the carrier frequency and which has a symmetrical shape which two peaks at plus and minus 75 kHz deviation from the carrier frequency with tapered skirts. At least some of the energy in the tapered skirts is needed for crystal clear FM stereo reception, so at least some of the skirts must be within the passband of the IF filters of the receiver to get clear reception without noticeable distortion. The problem with the analog embodiments described above is that the stability of the carrier frequency is not sufficient to keep the carrier frequency locked in the center of the channel to which the digitally tuned receiver is tuned. When the carrier frequency drifts away from the center frequency of the channel, it also drifts away from the center frequency of the IF filters passbands. This results in some of the energy of one skirt falling outside the skirt of the IF filter passband which results in loss of the information in the portion of the modulated signal's skirt which falls outside the receiver's filter passband. This causes noticeable distortion.

The solution to this problem is to digitally synthesize the RF carrier frequency using a phase locked loop which is locked in phase to a crystal controlled reference so there is never any drift. This means that at least portions of both skirts will be within the IF filter passband so that distortion will be reduced. Also, because any loss of information from the portions of the skirts of the Fourier spectrum of the FM modulated signal that are not within the IF filter passband is symmetric, any distortion caused as a result will be less. The digitally synthesized RF carrier approach is the architecture of the digital embodiments disclosed herein.

Components in FIG. 10 having the same reference number as a component in the embodiments of FIGS. 3 and 9 serve the same function as components with like reference numbers in those figures. A tank circuit comprised of inductor L1 and capacitor C8 and the variable capacitance of diode D1 (an 88105 in the preferred embodiment) provide a basic resonant frequency which defines the frequency of oscillation of the internal oscillator of the transmitter 39 in accordance with the capacitance of the varicap diode D1. Because the capacitance of the varicap diode can be changed by applying a tuning voltage on line 106, the internal oscillator of the FM transmitter 39 has, by this technique, been turned into the voltage controlled oscillator of a phase lock loop. The loop filter for the phase lock loop is shown at 104 and is comprised of capacitor C21, capacitor C22, resistor R15 and resistor R14. The PLL chip 100 and microprocessor supply the remaining elements of the phase lock loop's structure. FIG. 11 shows the equivalent structure of the PLL using the internal oscillator of the RF transmitter as the voltage controlled oscillator.

Referring to FIG. 11, the internal oscillator inside the Rohm FM stereo transmitter chip is shown at 101. A sample of the RF carrier signal generated thereby is output on line 102 to a divide-by-N circuit 103 inside the PLL chip 100. In the embodiment shown in FIG. 10, this sample of the RF carrier being generated is taken by a tap into the tank circuit at pin 9 of the Rohm chip as the RF voltage developed across picofarad capacitor to ground. This RF signal on line 102 is the signal the PLL is trying to phase lock to a crystal controlled reference signal. The divide-by-N circuit 103 functions to divide the RF carrier signal down by a programmable integer factor N. The microprocessor 108 supplies the factor N (and a factor R used to divide the crystal reference signal down to a lower frequency) via data bus 110 which is coupled to a data input of the PLL chip 100. The factor N, together with the factor R, determine the frequency of the carrier. A switch 116 coupled to the microprocessor by line 112 determines to which of two channels the RF carrier generated by the transmitter chip 39 is phase locked.

The RF carrier sample divided down to a lower frequency by the factor N is output on line 114 to a phase detector inside the PLL chip. The other input of this phase detector is a reference signal on line 122 having a frequency of approximately 50 kHz. The exact frequency of the reference depends upon the programmable factor R in a divide-by-R circuit 124 inside the PLL chip. The factor R is controlled by the microprocessor 108 via data bus 110. The divide-by-R circuit 124 receives a 4 mHz crystal controlled reference signal input from a crystal controlled oscillator. The crystal control oscillator is comprised of microprocessor 108 coupled to crystal 122 by lines 126 and 128. In alternative embodiments, the switch 114 can be eliminated, and the transmitter can transmit on only one frequency and the factors R and N can be eliminated thereby making possible the elimination of the microprocessor or substantial simplification of the control circuitry to set up the PLL chip for processing. The phase detector 130 compares the phase of the reference signal on line 122 and the RF carrier signal on line 129 and generates an error signal on line 132. The divide-by-N circuit 103 has its factor N set so as to divide the RF carrier signal on line 102 down to the same frequency as the reference signal on line 122, typically 50 kHz, although some other frequency on line 102 which is phase coherent with the 50 kHz reference on line 122 could also be used. The error signal is integrated by an integrator inside the PLL comprised of an OP amp 134 and capacitor 136 to generate the TUNE signal on line 106. The voltage of the TUNE signal changes the degree of reverse bias of the varicap diode D1 thereby changing its junction capacitance and altering the resonant frequency of the tank circuit comprised of varicap diode D1 and inductor L1. This alters the frequency of the RF carrier sample on line 102 in a direction to reduce the error signal on line 132 until the error signal is reduced to zero. Thereafter, if the RF carrier signal ever drifts off frequency, the error signal quickly brings it back to the exact center of the channel. The frequency of the RF carrier generated by the arrangement of FIGS. 11 and 10 is $$F_{out} = N\left(\frac{f_{crystal}}{R}\right)$$

where N and R are the factors which can be individually set by the microprocessor and R serves as a resolution determination factor setting the smallest increment of frequency by which the PLL can jump when changing to a new channel.

FIG. 12 is an equivalent circuit of the RF output arrangement showing how the RF carrier signal on line 47 from the internal oscillator 101 of the transmitter chip is coupled to the centertap of autotransformer 51, with each end of the autotransformer coil coupled to walkman or other audio source ground 45 and the transmitter ground 47, respectively. The RF choke 34, which is part of the tri-filar common mode RF choke shown in FIGS. 3 and 9, isolates the two ground segments of the dipole at RF frequencies only.

Figure 13:
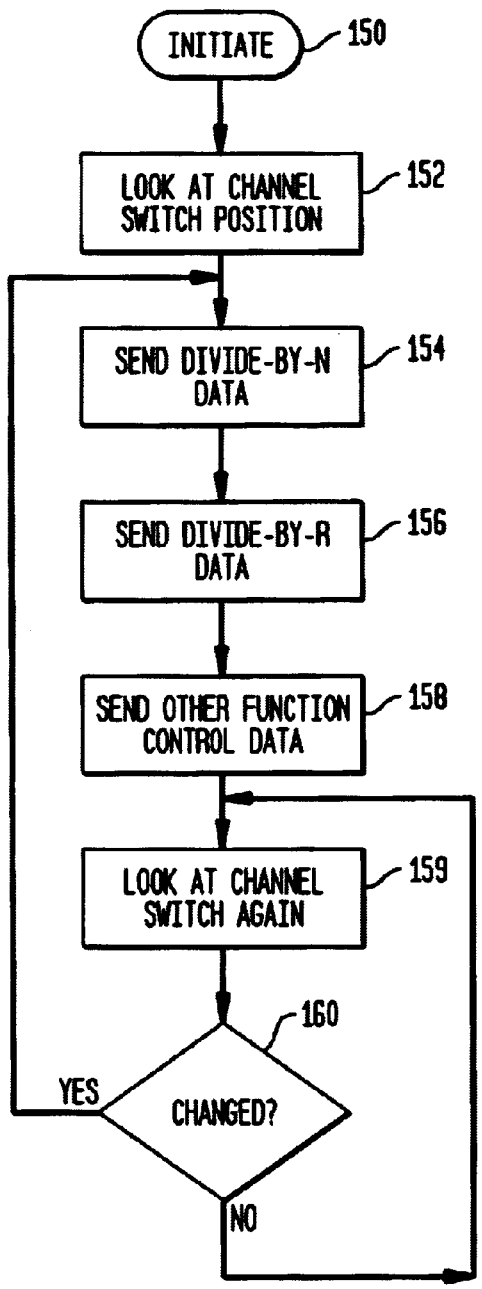
FIG. 13 is a flowchart of the process carried out by the microprocessor 108 in controlling the PLL chip.

FIG. 13 is a flowchart of the process carried out by the microprocessor 108 in controlling the PLL chip. Step 150 represents the process carried out at power up of initiating the microprocessor to begin processing. Step 152 represents the process of reading the channel switch to determine which channel in the FM broadcast band or some other frequency band on which to transmit. The transmitters disclosed herein are not limited to the FM broadcast band and could also transmit at other frequencies such as 40 MHz. Step 154 represents the process of sending the divide-by-N data to the PLL chip to set the value of N. Step 156 is the process of sending the divide-by-R data to the PLL chip to set the factor R. Step 158 represents the process of sending other function control data to the PLL to set it up for processing. Step 159 represents the process of checking the channel control switch again to see if there has been any change. Step 160 determines if there has been a change and vectors processing back to step 154 to send new N and R data if there has been a change. If no change has occurred, processing is vectored back to step 159 to begin a waiting loop to wait for a change in the channel switch. This processing could also be carried out by a state machine or a PAL.

Figure 14:
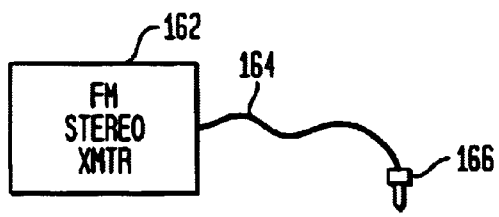
FIG. 14 shows another form factor for the FM stereo transmitter.

FIG. 14 shows another form factor for the FM stereo transmitter. In this embodiment, the portable transmitter is mounted in a housing 162 with a flexible three conductor cable 164 extending therefrom. The end of the cable is connected to a minijack audio plug 166 sized to mate with whatever female audio jack is common to most audio sources.

Figure 15:
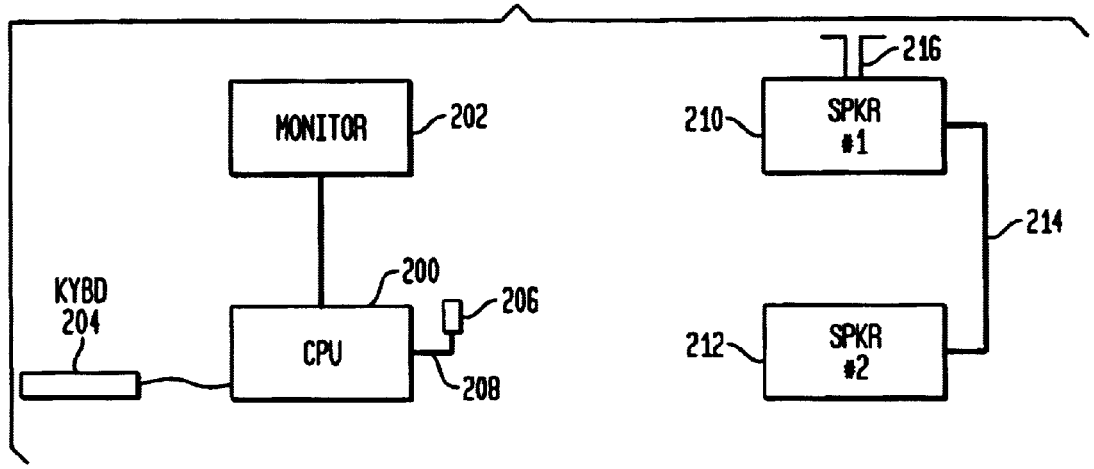
FIGS. 15, 16 and 17 show different applications for the technology.

FIG. 15 shows an application of the technology to a desktop computer environment. In this application, a CPU 200 such as a desktop Macintosh or Windows machine with sound card having an audio output jack has a transmitter 206 of one of the embodiments described herein as modified to use power from a wall outlet plugged into the audio output by the audio input lead or jack 208. The computer has a monitor 202 and keyboard 204. A set of multimedia speakers 210 and 212 can then be located anywhere in the room without the need for wires connecting them to the computer. The master speaker 210 drives the slave speaker 212 through audio cable 214. The master speaker 210 is modified however to incorporate an FM stereo receiver capable of tuning to the transmitted frequency. The FM stereo receiver can use an external dipole or rod antenna 216 or have the antenna structure formed internally of speaker 1.

Figure 16:
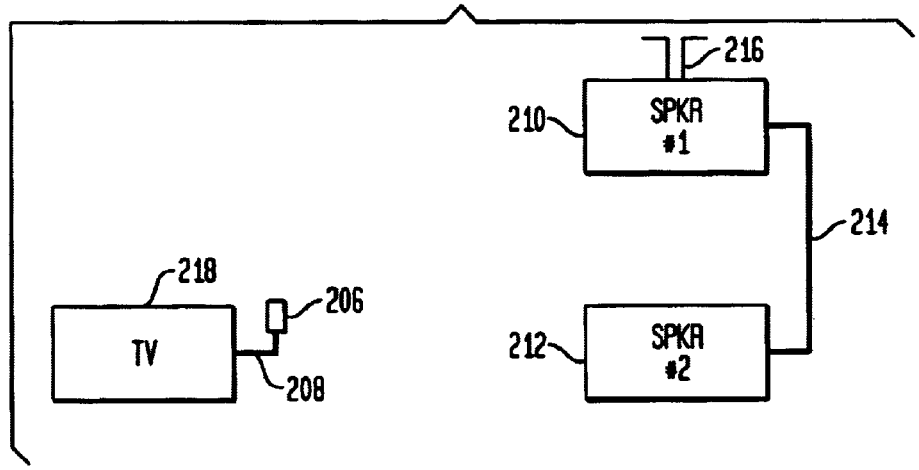

FIG. 16 is a diagram showing another application for the technology to use external wireless speakers with a TV which has an audio output earphone jack. TV 218 can be any TV with an earphone audio output jack. The small transmitter 206 is plugged into the earphone jack and the wireless multimedia speakers 210 and 212 (powered either by batteries or wall power) having the same structure as the multimedia speaker shown in FIG. 15 can then be located anywhere in the room or even another room if range is adequate.

Figure 17:
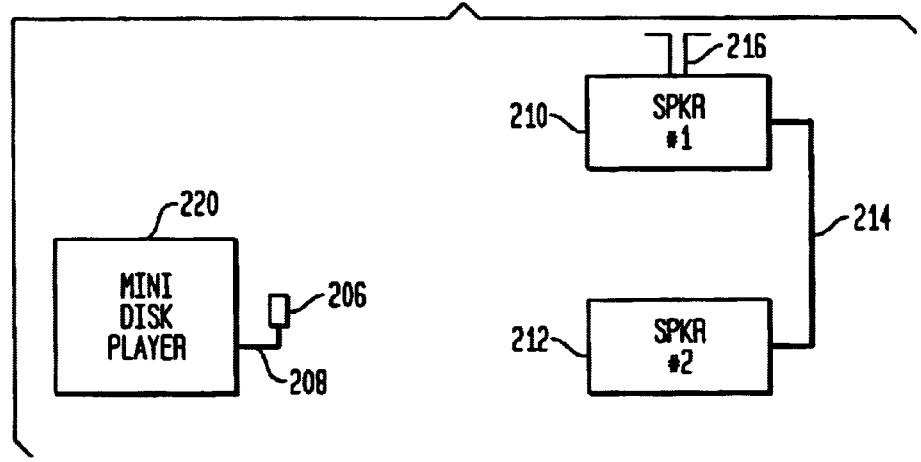

FIG. 17 is diagram illustrating application of the technology to a minidisk player 220 which can also be a portable CD player or a recordable CD unit. The technology is applicable to any audio source that has an earphone audio output jack.

Although the invention has been described in terms of the preferred and alternative embodiments disclosed herein, those skilled in the art will appreciate that various other alternative arrangements can be made. All such alternative embodiments which do not depart from the spirit and scope of the invention are intended to be included within the scope of the claims appended hereto.

What is claimed is:

1. A lightweight portable RF transmitter system, comprising:
   (a) an audio source having an output jack and having a signal ground conductor coupled to a first terminal of said output jack, said audio source having audio channels which output signals and which are coupled to second and third terminals of said output jack; and
   (b) an RF transmitter subsystem from which extends a cable having a plurality of wires wherein each one of said plurality of wires is correspondingly coupled to a terminal corresponding to said each wire coupled to first, second and third terminals, respectively, of an audio plug sized to mate with said output jack said first, second and third terminals of said audio plug being electrically coupled by first, second and third RF chokes to said first, second and third terminals, respectively, of said output jack when said audio plug is inserted into said output jack, said first, second and third RF chokes being the windings of a filar wire, common-mode radio frequency choke, and wherein said RF transmitter further comprises:
       (i) an antenna comprising a signal ground conductor coupled via a first wire of said cable and a first terminal of said audio plug and said first winding of said filar wire, common-mode radio frequency choke to said signal ground conductor of said audio source through said first terminal of said output jack when said output jack and audio plug are mated;
       (ii) an RF output comprising an RF ground output terminal coupled to said signal ground conductor of said transmitter;
       (iii) and an RF output terminal coupled via an autotransformer to said first terminal of said audio plug so as to be connected to said signal ground conductor of said audio source when said output jack and audio plug are mated, said autotransformer having a turns ratio selected to approximately match the output impedance of said RF transmitter to said input impedance of said antenna; and
       (iv) stabilizing means for stabilizing the frequency of transmission thereof to be as close as possible to the center of a selected channel for transmission, and wherein said stabilizing means further comprises:

(1) a voltage controlled oscillator;
(2) a loop filter; and
(3) a phase lock loop chip having a microprocessor.

2. The RF transmitter system of claim 1, wherein said cable is a three conductor cable having first, second and third wires coupled to first, second and third terminals, respectively, of an audio plug sized to mate with said output jack.

3. The RF transmitter system of claim 1, wherein said corresponding RF chokes comprise first, second and third RF chokes and wherein said first, second and third RF chokes are the three windings of a three-winding, tri-filar wire, common-mode radio frequency choke.

4. The RF transmitter system of claim 1, wherein said three windings of said radio frequency choke have a high impedance at approximately 100 MHz but approximately zero impedance at audio frequencies and having the same inductance.

5. The RF transmitter system of claim 1, wherein RF transmitter subsystem is integrated into with said audio source so that they share a common housing.

6. The RF transmitter system of claim 1, wherein said RF transmitter subsystem is integrated with a receiver subsystem to so as to provide two-way communications to a system user.

7. The RF transmitter system of claim 1, wherein power for said RF transmitter system is battery supplied and integral to said RF transmitter system.

8. The RF transmitter system of claim 1, wherein power for said RF transmitter system is supplied by the system hosting said audio source.

9. The phase lock loop chip of claim 1, said phase lock loop chip further comprising:
   (a) a divide-by-N circuit for dividing an RF carrier signal down by a programmable integer factor N;
   (b) a divide-by-R circuit for dividing the crystal reference signal of said phase lock loop down to a lower frequency; and
   wherein said factor N together with said factor R determine the frequency of said RF carrier.

10. An audio system comprising:
   (a) an audio source for supplying audio signals at an earphone or other audio output jack, said output jack having at least first and second terminals, said audio source having a signal ground conductor coupled to said first terminal, and inputting said audio signals via said second terminal;
   (b) an RF transmitter having an RF output at which said RF transmitter supplies as an output signal an FM stereo modulated RF carrier and having an audio plug sized to mate with said output jack, said RF transmitter having a signal ground conductor and having an audio input, said audio plug having a first terminal which makes electrical contact with said first terminal of said output jack when said audio plug is mated with said output jack, said first terminal of said audio plug coupled to said RF output, and said second terminal of said audio plug making electrical contact with said second terminal of said output jack when said output jack and said audio plug are mated;
      (i) and, wherein said RF transmitter includes a phase lock loop which locks the transmit frequency to a frequency in the center of a selected transmit channel using a crystal controlled reference frequency, and wherein said stabilizing means further comprises:
         (1) a voltage controlled oscillator;
         (2) a loop filter; and
         (3) a phase lock loop chip having a microprocessor;
   (c) an antenna comprising said signal ground conductor of said audio source as one element of said antenna and said signal ground conductor of said RF transmitter as another element of said antenna, said antenna having a complex impedance which has a real component and an imaginary component; and further comprising:
      (i) isolation means coupled between said first terminal of said audio plug of said RF transmitter and said signal ground conductor of said RF transmitter for electrically isolating the signal ground conductors of said RF transmitter and said audio source at the frequency of said RF carrier but for electrically coupling said signal ground conductors of said RF transmitter and said audio source via a low impedance path at audio frequencies, and for canceling at least part of said reactive component of said antenna impedance so as to transform the impedance of said dipole antenna closer to a purely real impedance with a smaller reactive component; and
      (ii) means coupled to said RF output for transforming said impedance of said antenna, as modified by said isolation means, to an impedance which is a closer match to the complex conjugate of the output impedance of said RF transmitter at said RF output.

11. A system for use with an audio source for supplying audio signals at an output jack, said output jack having a least first and second terminals, said audio source having a signal ground conductor coupled to said first terminal, said audio signals coupled to said second terminal, comprising:
   (a) an FM stereo RF transmitter having an RF output at which said RF transmitter supplies as an output a modulated RF carrier and having an audio plug sized to mate with said output jack, said RF transmitter having a signal ground conductor and having left and right stereo audio inputs coupled to left and right stereo audio outputs of said audio source by RF chokes and terminals of said audio plug and said output jack when said audio plug is mated with said output jack, said audio plug having a first terminal which makes electrical contact with said first terminal of said output jack when said audio plug is mated with said output jack, said first terminal of said audio plug coupled to said RF output;
   (b) a dipole antenna comprising said signal ground conductor of said audio source as one element of said dipole and said signal ground conductor of said RF transmitter as another element of said dipole antenna, said dipole antenna having a complex impedance which has a real component and an imaginary component;
   (c) isolation means coupled between said first terminal of said audio plug of said RF transmitter and said signal ground conductor of said RF transmitter for electrically isolating the signal ground conductors of said RF transmitter and said audio source from each other at the frequency of said RF carrier but for electrically coupling said signal ground conductors of said RF transmitter and said audio source via a low impedance path at audio frequencies, and for canceling at least part of said reactive component of said antenna impedance so as to transform the impedance of said dipole antenna closer to a purely real impedance with a smaller reactive component;
   (d) impedance transformation means coupled to said RF output for transforming said impedance of said dipole antenna, as modified by said isolation means, to an impedance which is a closer match to the complex conjugate of the output impedance of said RF transmitter at said RF output; and (e) means for locking the frequency of transmission in the approximate middle of a stereo transmission band using a crystal controlled reference frequency such that enough of the energy in the Fourier spectrum of the FM stereo modulated carrier generated by the transmitter is within the IF filter passband of any receiver being used to receive the signal so as to reduce distortion to negligible levels.

12. The system of claim 11 wherein said isolation means is one winding of a tri-filar wire, three-winding, common-mode RF choke coupling said first terminal of said audio plug to said signal ground conductor of said RF transmitter and wherein said RF chokes are the other two windings of said tri-filar wire, three-winding, common-mode RF choke and function to filter out stray RF on the audio output channels of said audio source, and wherein all three windings have the same impedance.

13. The system of claim 11 wherein said isolation means is one winding of a multiple coil RF choke wherein all windings share the same magnetically permeable core and wherein one of said windings couples said first terminal of said audio plug to said signal ground conductor of said RF transmitter and wherein said other windings each couple one of said other terminals of said audio plug which receive audio signals from said audio source to an audio input of said RF transmitter.

14. The system of claim 11 wherein said impedance transformation means is an autotransformer having one winding with a tap along said winding coupled to said RF output of said RF transmitter and having one end of said winding coupled to signal ground conductor of said RF transmitter and having the other end of said winding coupled to said dipole antenna.

15. The system of claim 11 further comprising a receiver mounted on a headphone, said receiver tuned to the frequency of said RF transmitter, said receiver having an IF section comprised of two cascaded piezoelectric resonators and an amplifier coupled so as to increase the selectivity of said receiver.

16. The system of claim 15 wherein each of said piezoelectric resonators has a passband bandwidth selected such that the net bandwidth of the receiver is set in accordance with Carson's Rule based upon the FM frequency deviation of said transmitter.

17. An RF transmitter unit for use with an audio unit including an audio circuit outputting an audio signal at output jack, said output jack having an output terminal receiving the audio signal and a ground terminal connected to a ground trace of said audio unit, the RF transmitter unit comprising:

(a) an input plug having an input terminal and a ground terminal, the input plug being sized to mate with the output jack of the audio unit such that the output and ground terminals of the output jack contact the input and ground terminals of the input plug, respectively, when the input plug and output jack are mated; and (b) an RF transmitter which is small enough to attach to a portable audio source such as a portable cassette or portable CD player by VELCRO or other attachment means, and having an input terminal and first and second RF output terminals, the input terminal of the RF transmitter being connected to the input terminal of the input plug for receiving the audio signal when the input plug and output jack are mated, the first RF output terminal being coupled via an impedance matching transformer to the ground terminal of the input plug, said ground terminal of said input plug being coupled via an RF choke to said ground terminal of said output jack such that when the input plug and output jack are mated the ground trace of the audio unit acts as one radiating element of an antenna and the ground trace of the RF transmitter acts as the other radiating element of the antenna, said RF transmitter including a phase lock loop for controlling the frequency of the transmitted signal so as to remain in the approximate center of a channel of limited bandwidth in which the transmitter transmits.

18. The RF transmitter unit according to claim 17 further comprising a RF choke connected between the first and second RF output terminals and operable to isolate the two radiating elements of the antenna from each other at the transmitting frequency of the RF transmitter, and further comprising means for enabling selection of at least two different transmit channels.

19. The RF transmitter unit according to claim 17 further comprising means for generation of an FM stereo modulated carrier of any frequency.

20. The RF transmitter unit according to claim 19 wherein said audio unit has left and right stereo audio outputs coupled to terminals of said output jacke and wherein said transmitter has left and right stereo inputs which are coupled via terminals of said audio plug and said output jack to said left and right stereo audio outputs of said audio unit via first and second windings of a tri-filar wire, three-winding, common-mode RF choke.

21. The RF transmitter unit according to claim 17, wherein said impedance matching transformer is a step down autotransformer connected between the first RF output terminal and the ground terminal of the input plug to more closely match the output impedance of the RF transmitter with the impedance of the antenna.

22. A portable DC powered RF transmitter unit for use with an audio unit including an audio circuit which supplies as an output an audio signal and an output jack having an output terminal for receiving said audio signal and a ground terminal connected to a ground trace of said audio unit, said RF transmitter unit comprising:

(a) a housing;

(b) an input plug attached to said housing and having an input terminal and a ground terminal, said input plug being sized to mate with the output jack of the audio unit such that said output terminal and said ground terminals of said output jack contact with said input and said ground terminals of said input plug, respectively, when the input plug and output jack are mated;

(c) a printed circuit board within said housing;

(d) an RF transmitter mounted on said printed circuit board and having an input terminal and a first and a second RF output terminal, said input terminal of said RF transmitter being connected to said input terminal of said input plug for receiving said audio signal when said input plug and said output jack are mated;

(i) said first RF output terminal being connected to said ground terminal of said input plug such that when said input plug and said output jack are mated the ground trace of said audio unit acts as a radiating element of an antenna;

(ii) said second RF output terminal being connected to a ground trace of the RF transmitter unit, the ground trace of said RF transmitter acting as the other radiating elements of the antenna, said RF transmitter including a phase lock loop for controlling the frequency of the transmitted signal so as to remain in the approximate center of a channel of limited bandwidth in which said transmitter transmits; and (e) an RF choke connected between said first and said second RF output terminals and operable to isolate said two radiating elements of said antenna from each other at the transmitting frequency of said RF transmitter.

23. The RF transmitter unit according to claim 22 wherein the ground trace of the RF transmitter comprises a signal ground conductive trace.

24. The RF transmitter unit according to claim 23 wherein the ground trace of the RF transmitter further comprises conductive circuit components of the RF transmitter which are connected to the second RF output terminal.

25. The RF transmitter unit according to claim 22, further comprising a step down transformer connected between the first RF output terminal and the ground terminal of the input plug to more closely match the output impedance of the RF transmitter with the impedance of the antenna.

26. A data transmission system, comprising:

(a) a data source having an output jack and having a signal ground conductor coupled to a first terminal of said output jack; and (b) a data transmitter subsystem from which extends a cable having a plurality of wires wherein each one of said plurality of wires is correspondingly coupled to a terminal corresponding to said each wire respectively of a plug sized to mate with said output jack, said first, second and third terminals of said plug being electrically coupled to said first, second and third terminals, respectively, of said output jack when said plug is inserted into said output jack, and wherein said data transmitter subsystem further comprises:

(i) an antenna comprising a second signal ground conductor coupled to said signal ground conductor of said data source through said first terminal of said output jack when said output jack and said plug are mated;

(ii) a data output means comprising a ground output terminal coupled to said signal ground conductor of said data transmitter subsystem;

(iii) a data output terminal coupled via an autotransformer to said first terminal of said plug so as to be connected to said signal ground conductor of said data source when said output jack and said plug are mated, said autotransformer selected to approximately match the output impedance of said data source to said input impedance of said antenna; and (iv) means for stabilizing the frequency of transmission thereof to be as close as possible to the center of a selected channel for transmission.

27. The data transmitter system of claim 26, wherein power for said data transmitter system is battery supplied and integral to said data transmitter system.

28. The data transmitter system of claim 26, wherein power for said data transmitter system is supplied by the system hosting said audio source.

* * * * *